3,621,706
FLUID VAPORIZATION TESTER AND METHOD
Francis J. Markey, Lewisburg, Ohio, assignor to General
Motors Corporation, Detroit, Mich.
Filed July 2, 1969, Ser. No. 838,514
Int. Cl. G01n 25/02
U.S. Cl. 73—17 A
6 Claims

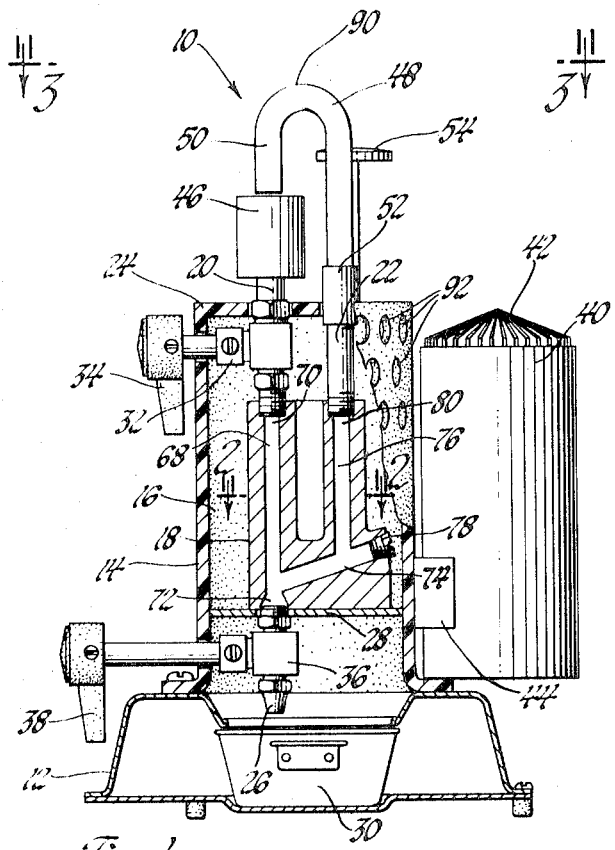
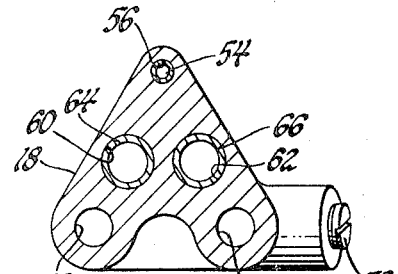
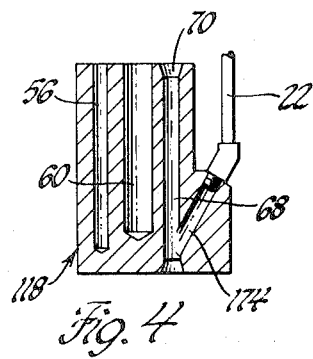
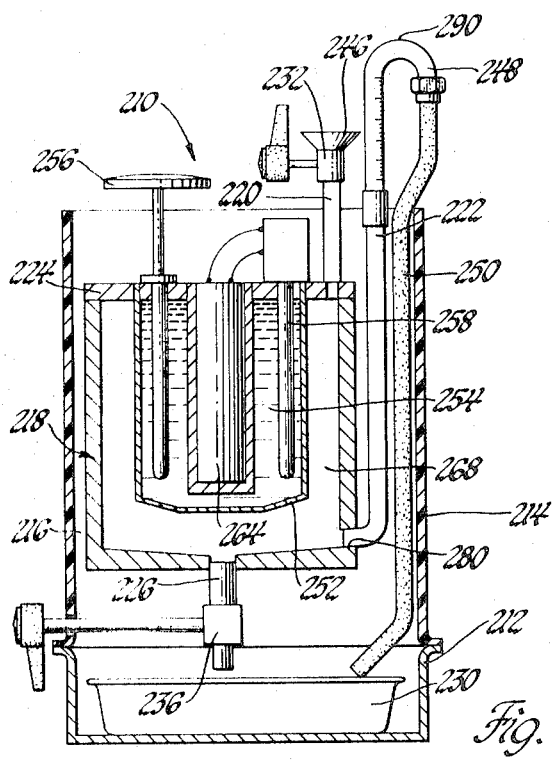
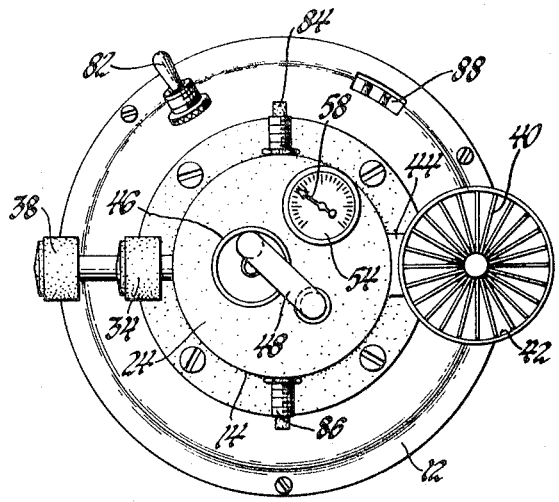
INVENTOR.
Francis J. Markey
BY
D. D. McGraw
ATTORNEY 000# United States Patent Office 3,621,706
Patented Nov. 23, 1971

ABSTRACT OF THE DISCLOSURE

A visual fluid vaporization indicator in which a sample of the fluid is placed in a boiler and heated to cause a percolating action. A fluid column surges through the visual indicator tube at the vaporization temperature of the fluid. This temperature is measured and is considered to be the boiling point of the fluid sample.

---

The invention relates to a fluid vaporizing testing mechanism and method and more particularly to a mechanism in which a sample of fluid is heated to the vaporization point to cause a percolating action through a visual indicating tube, the percolating action being observable by a surge of fluid through the tube. A thermometer is utilized to measure the temperature of the fluid at the time of the surge and this temperature is the boiling point of the fluid being tested.

The mechanism lends itself to a compact construction which is portable and may be readily utilized in the laboratory, in diagnostic centers, or in more usual automotive service centers such as those normally found in connection with service stations.

In one modification the boiler assembly is positioned within a ventilated case. The top of the case has suitable provision for the filling of the boiler heating passage with the sample fluid to be tested, the visual indicator, and the thermometer which registers the temperature of the fluid. A suitable cooling fan arrangement is provided so as to cool the installation after the test has been completed. The lower portion of the case is mounted on a base which also holds a drain pan to receive the fluid after it has been tested. Two heaters which are thermostatically controlled are provided, the first heater and the second heater working in concert to heat the fluid quickly to a level somewhat below the expected boiling point of the fluid, and the heaters then having a reduced input so that they heat more slowly, or one of the heaters may be de-energized to provide the similar effect. The entire unit may be quickly drained of test fluid after the test is completed.

In the other modification disclosed, the boiler is positioned in a similar manner with respect to filling means, the thermostats, the thermometer and the visual indicator. However, the heating unit is immersed in a bath of mercury in order to distribute the heat quickly and evenly. The fluid being tested is contained in an annular chamber surrounding the mercury container. A similar drain arrangement is provided.

In the drawings:

FIG. 1 is an elevation view of a mechanism embodying the structure of the invention and capable of being used in carrying out the inventive method. The structure is illustrated with parts being broken away and in section.

FIG. 2 is a fragmentary cross-section view of the boiler portion of the mechanism of FIG. 1, taken in the direction of arrows 2—2 of that figure.

FIG. 3 is a view of the top of the mechanism of FIG. 1 as taken in the direction of arrows 3—3 of that figure.

FIG. 4 is a fragmentary cross-section view of a modification of the boiler of FIG. 1.

FIG. 5 is a view similar to FIG. 1 of a modified mechanism embodying the invention, with parts in section.

The testing mechanism 10 in FIG. 1 has a base 12 supporting a case 14 having mounted in the boiler chamber 16 thereof the boiler 18, with the fill pipe 20 and the expansion tube 22 connected to the boiler 18 and extending through the top 24 of the case. The drain pipe 26 is connected to the boiler 18 and extends through the case bottom 28, so that any fluid flowing out of the drain pipe is received by the removable drain pan 30. The drain pan is suitably mounted in the base 12 so that it is underneath the drain pipe 26 and can receive fluid passing through the drain pipe. A fill valve 32 is connected in the fill pipe 20 and is controlled by a valve handle 34 extending outwardly through the side of case 14. A similar valve functioning as a drain valve 36 is connected in drain pipe 26 to control the flow of fluid from the boiler. Valve 36 is controlled by handle 38 which extends outwardly through the side of case 14. A cooling fan assembly 40 is mounted on the side of case 14 and has an air inlet 42 and an outlet duct 44 which is suitably connected to the interior of case 14 so that, when the fan is running, cooling air is forced through the case and around the boiler 18 to cool the boiler.

The upper end of fill pipe 20 has a cup 46, which may be in the general form of a funnel, and which provides for filling the boiler with fluid to be tested and also acts as a container for the overflow of fluid while the testing is in progress. The upper end of expansion tube 22 is connected to one end of an inverted U-shaped visual indicator tube. The end 50 of tube 48 extends over the cup 46 so that any fluid passing through the tube will be discharged into the cup. The tube 48 may be pivoted at its connection 52 with expansion tube 22. This permits easy access to cup 46 and also permits the end 50 of the tube to be located directly above the cup while carrying out the testing operation. A thermometer 54 extends through the top 24 of the casing 14 and into a thermometer recess 56 formed in boiler 18. Thermometer 54 is preferably of a type having an indicating dial 58 which may be readily read by the test equipment operator.

The boiler 18 is illustrated as being constructed of a suitable material, such as brass or aluminum, which has a high level of heat conductivity. In addition to the thermometer recess 56, which extends downwardly from the top of the boiler 18, the boiler is provided with heater recesses 60 and 62. Heaters 64 and 66 are respectively received in these recesses. A boiler passage 68 extends through the boiler 18 and is connected at its inlet end 70 with fill pipe 20 and at its outlet end 72 with drain pipe 26. An expansion passage 74 is provided in a lower portion of the boiler 18 and is angularly positioned so that the lower end of the passage 74 intersects the boiler passage 68 immediately above the outlet end 72. Another expansion passage 76 extends from the top of the boiler so that it also intersects expansion passage 74, but at a higher level than the intersection of passages 68 and 74. A suitable plug 78 closes the upper end of expansion passage 74, and expansion tube 22 is connected to the outlet end 80 of the expansion passage 76.

FIG. 2 shows a cross-section of the boiler 18 and the proximity of the various passages and recesses formed therein.

As is better seen in FIG. 3, a switch 82 is provided which controls electrical power for the heaters 64 and 66. Suitable connections 84 and 86 are provided for each of the heaters and their thermostats. An electric power line may be connected to the plug 88 to provide power for the heating coils and for the fan assembly 40.

In order to operate the tester, the cup 46 is placed in the position shown in the fill pipe 20. The fill valve 32 is in the closed position as is the drain valve 36. The fluid to be tested is poured into the cup 46 until it reaches a predetermined level which may be marked on the cup.

The fill valve 32 is then opened and this measured quantity of test fluid closed downwardly through fill pipe 20 and inlet 70 to the boiler passage 68. Since the drain valve 36 is closed, the sample of fluid to be tested flows into expansion passage 74 and upwardly into expansion passage 76 until it reaches the level required. The quantity of fluid to be tested is such that all other fluid is contained within the boiler passages 68, 74 and 76. At this time the fill valve 32 is closed and the indicator tube 48 is pivoted so that its outlet end 50 is capable of discharging any fluid into the cup 46.

Switch 82 is moved to the position which energizes both heaters 64 and 66. In this position the fan 40 is not energized. The heat from the heaters passes through the boiler 18, since it is made of a high heat conductive material, and heats up the fluid in the boiler passage 68 and the expansion passage 76. The thermostat controlling heater 64 is so set that this heater will either be cut off or reduced in heat output before the expected boiling point of the test fluid sample is reached. If, for example, the test fluid is a vehicle hydraulic brake fluid, the heater may be either cut off or reduced in power when the temperature reaches approximately 300°. If heater 64 is cut off, heater 66 continues to heat. In case both of the heaters continue to be utilized, both of them are controlled by their thermostats to have a reduced output at temperatures below the boiling point of the fluid.

The energized heater or heaters continue to heat the fluid in the boiler and expansion passages until the fluid reaches the vaporization point. As vapor forms it cannot escape through the inlet 70 of the boiler passage since fill valve 32 is closed. It, therefore, must pass through the expansion passage 74 and the expansion passage 76. Normally the fluid being tested will expand with heat and it will be able to be seen in the lower part of the visual indicator 48 near the connection 52. As vapor continues to form, a percolating action occurs, forcing fluid which is in expansion passage 76 to surge upwardly through the visual indicator tube 48. When sufficient heat has been applied to generate enough vapor pressure, a surge of fluid will take place through the arch 90 at the upper end of tube 48. Thermometer 54 will have indicated the increase in temperature as the heaters heat the fluid. The test operator observes the surge of fluid through arch 90 and records the temperature indicated on the thermometer dial 58. This temperature is sufficiently close to the actual temperature of the test fluid that it is practical to consider it to be the same as the test fluid temperature. The fluid passing through arch 90 passes out of the outlet end 50 of the indicator tube and is contained in the cup 46 and the upper portion of fill pipe 20 above the closed valve 32.

When this portion of the test has been completed, the operator turns switch 82 to the cooling position, cutting out the power to the heaters and turning on the fan 40. The fan blows cooling air through duct 44 into the interior of case 14. This air passes about the boiler 18 and out of the case through appropriate openings 92. The operator then opens fill valve 32 and drain valve 36 and the test fluid contained in cup 46, the fill pipe 20, boiler passage 68, and expansion passages 74 and 76 passes through the outlet 72 and valve 36 and into the drain pan 30. The sample of tested fluid may then be readily removed.

FIG. 4 shows a somewhat modified boiler 118 in which the expansion tube 122 extends downwardly to the upper end of the expansion passage 174, which connects with the lower end of the boiler passage 68 as before. In this arrangement all of the heat which heats the fluid to be tested heats fluid in the boiler passage 68 instead of in the other expansion passage 76 of the first modification. This construction eliminates some vaporization which may at times take place in the expansion tube due to too much heat in that area. With the expansion tube 122 being positioned away from the boiler body, the fluid in the expansion tube has a slightly lower temperature than the fluid in boiler passage 68. Thus all of the vaporization takes place in boiler passage 68 and the vapor pressure generated in the closed upper end of the passage causes the percolating action of the fluid through the visual indicator tube 48.

The modified mechanism embodying the invention and shown in FIG. 5 has a different boiler arrangement and a somewhat different connection of the expansion tube to the fluid container. The testing mechanism 210 has a base 212 supporting the case 214. The case has a boiler chamber 216 containing the boiler assembly 218. The upper end 224 of the boiler assembly 218 has connected to it a fill pipe 220. At the lower side of the boiler assembly the expansion tube 222 is connected to the test fluid chamber 268 at expansion outlet 280. Chamber 268 contains the fluid to be tested. The lower end of the boiler assembly has the drain pipe 226 connected to chamber 268 so that the entire chamber and expansion tube may be drained when desired. The removable drain pan 230 is positioned underneath drain pipe 226 to receive the drained fluid. A fill valve 232 is connected to the upper end of the fill pipe 220 and a drain valve 236 is connected to drain pipe 226 to control the flow of fluid through these respective pipes. A funnel 246 is positioned in the upper end of the fill pipe 220 on the upper side of fill valve 232 so that fluid passing through the funnel is controlled by the fill valve. The inverted U-shaped visual indicator tube 248 is connected to expansion tube 222 at one end and at its other end is connected to the overflow tube 250. This tube leads downwardly through the interior of case 214 and discharges into drain pan 230.

The boiler assembly 218 includes a container 252 extending into the test fluid chamber 268 and containing a mercury bath 254. The thermometer 256 extends into the mercury bath and measures the temperature of the mercury as the heater 264 is heating the mercury and through it the fluid in test fluid chamber 268. The heater 264 extends into the mercury bath and is controlled by a thermostat 258 which also extends into the mercury bath.

In this construction when the heater 264 is energized, the mercury bath 254 is heated and the test fluid in chamber 268 is also heated. As before, during the heating process the fill valve 232 and the drain valve 236 are in their closed positions. As the test fluid is heated, vapor forms in the upper portion of chamber 268 and in the closed fill pipe 220. Also the fluid expands and can be seen as it expands through expansion tube 222 and into the end of indicator tube 248 connected therewith. If desired, the tube 248 may be calibrated as illustrated to also obtain information with regard to expansion of the test fluid. When the vapor pressure increases sufficiently, a surge of test fluid will be percolated through the arch 290 of the visual indicator and will pass through the overflow tube 250 and into the drain pan 230. The temperature at the time of this occurrence may be read by the operator on the dial of thermometer 256. Upon completion of the test the fill valve 232 and the drain valve 236 are opened and the test fluid contained within the mechanism is drained into the drain pan 230 for removal.

Mechanism embodying the invention may be utilized to quickly and accurately test various fluids to determine their boiling points. This is particularly important in the maintenance and service of automobiles since the brake fluid tends to have a lower boiling point after usage. It is, therefore, desirable to be able to quickly test brake fluid with a relatively small sample and to determine the exact boiling point. The mechanism may also be utilized to test other fluids such as a radiator coolant. It is an important feature of the inventive mechanism and method that a surge of fluid is generated which provides a physical indication of the boiling point which may be read on a suitable temperature gauge.

What is claimed is:

1. A fluid vaporization tester comprising:
   a boiler having a fluid inlet passage and a heating chamber and a vapor outlet passage in fluid communicating relationship, valve means for opening said inlet passage to supply sample fluid to be tested to said boiler and for closing said inlet passage during the testing operation, heater means for heating said boiler to vaporize sample fluid therein, a visual indicator including an inverted U-shaped tube having one end connected with said vapor outlet and receiving an observable surge of fluid therethrough by percolator action of the vaporizing fluid, drain means connected with the other end of said inverted U-shaped tube and receiving fluid surged through said tube and maintaining the fluid so received fluidly separate from the fluids in said boiler, and a thermometer positioned within said boiler and operatively indicating the temperature of the fluid in said boiler at the time of the first observable surge, the temperature so indicated being substantially the temperature of the boiling point of the sample fluid being tested.

2. The tester of claim 1,
said boiler being made of a highly heat conductive material and said heater means being positioned in recess means in said housing adjacent said heating chamber,
and thermostat means for controlling said heater means to give a first rate of temperature increase to a level below the sample fluid probable boiling point and then to give a different rate of temperature increase until the sample fluid boiling point is reached and measured.

3. The tester of claim 1,
said boiler having said heater means received therein in a bath of mercury contained in a chamber substantially surrounded by sample fluid to be tested.

4. The tester of claim 1,
said boiler having a filling receptacle in said inlet passage, said valve means being a fill valve operable to let a measured quantity of sample fluid flow from said receptacle to said heating chamber and closeable to block vapor from percolating out through said inlet passage, a drain passage connecting the lowest part of said heating chamber and said drain means, and a drain valve in said passage openable to allow the sample fluid in said boiler to flow into said drain means.

5. The method determining the boiling point of a sample fluid comprising the steps of:
   (a) heating a body of sample fluid to vaporize a portion thereof,
   (b) percolating a portion of the sample fluid through a visible inverted U-shaped indicator by gas pressure of the vaporized fluid,
   (c) and measuring the temperature of the body of sample fluid at the time of the first percolating surge of sample fluid through and beyond the highest point of the visible inverted U-shaped indicator.

6. The method of claim 5 in which step (a) includes heating the sample fluid at a high rate to a temperature approaching but not reaching the boiling point of the sample fluid, and then heating the sample fluid at a lesser rate to reach the boiling point of the sample fluid.

References Cited

UNITED STATES PATENTS

| | | | |
|---|---|---|---|
| 2,900,816 | 8/1959 | Anderson | 73—17 |
| 3,107,516 | 10/1963 | Markey | 73—17 |

OTHER REFERENCES

Swietoslawski et al.: "Boiling and Condensation Temperatures" in Weissburger Physical Methods, Part I, 3rd edition, 1959, Interscience Publishers pp. 368–375.

RICHARD C. QUEISSER, Primary Examiner

H. GOLDSTEIN, Assistant Examiner